US012781633B2

(12) United States Patent
Bettentrup et al.

(10) Patent No.: US 12,781,633 B2

(45) Date of Patent: Nov. 3, 2026

(54) ROTOR DISK, ROTOR, AND METHOD FOR SERVICING A ROTOR DISK

(71) Applicant: Siemens Energy Global GmbH & Co. KG, Munich (DE)

(72) Inventors: Jörn Bettentrup, Dorsten (DE); Ulrich Stanka, Mülheim an der Ruhr (DE)

(73) Assignee: Siemens Energy Global GmbH & Co KG, Munich (DE)

( * ) Notice: Subject to any disclaimer, the term of this patent is extended or adjusted under 35 U.S.C. 154(b) by 18 days.

(21) Appl. No.: 18/842,518

(22) PCT Filed: Jan. 20, 2023

(86) PCT No.: PCT/EP2023/051311

§ 371 (c)(1),
(2) Date: Aug. 29, 2024

(87) PCT Pub. No.: WO2023/169725

PCT Pub. Date: Sep. 14, 2023

(65) Prior Publication Data

US 2025/0179920 A1 Jun. 5, 2025

(30) Foreign Application Priority Data

Mar. 10, 2022 (DE) ..................... 10 2022 202 368.4

(51) Int. Cl.
*F01D 5/02* (2006.01)
*F01D 5/30* (2006.01)

(52) U.S. Cl.
CPC ............. *F01D 5/02* (2013.01); *F01D 5/3007* (2013.01); *F05D 2230/10* (2013.01)

(58) Field of Classification Search
CPC ........ F01D 5/02; F01D 5/3007; F01D 5/3038; F05D 2230/10; F05D 2250/294; F05D 2230/80
See application file for complete search history.

(56) References Cited

U.S. PATENT DOCUMENTS

| | | | | |
|---|---|---|---|---|
| 4,910,958 | A | 3/1990 | Kreitmeier | |
| 5,554,005 | A * | 9/1996 | Nguyen | F01D 5/3007 416/248 |

(Continued)

FOREIGN PATENT DOCUMENTS

| | | | |
|---|---|---|---|
| CH | 702203 | A1 | 5/2011 |
| CH | 704617 | A1 | 9/2012 |

(Continued)

OTHER PUBLICATIONS

PCT International Search Report and Written Opinion of International Searching Authority mailed Mar. 28, 2023 corresponding to PCT International Application No. PCT/EP2023/051311 filed Jan. 20, 2023.

*Primary Examiner* — Chelsea E Stinson
*Assistant Examiner* — Eric A Lange
(74) *Attorney, Agent, or Firm* — Wolter Van Dyke Davis, PLLC

(57) ABSTRACT

A rotor disk includes a slot for receiving a blade foot of a turbine blade, wherein the slot has multiple indentations along the longitudinal axis of the slot for protrusions of the blade foot and so as to complement said protrusions. An axial bulging is provided within the at least one projection, in particular multiple projections of a slot have a bulging.

6 Claims, 2 Drawing Sheets

(56) References Cited

U.S. PATENT DOCUMENTS

| | | | | |
|---|---|---|---|---|
| 6,106,188 | A * | 8/2000 | Krautzig ............... | F01D 5/3007 403/375 |
| 6,183,202 | B1 | 2/2001 | Ganshaw | |
| 7,513,747 | B2 | 4/2009 | Bachofner | |
| 2009/0022591 | A1* | 1/2009 | Mujezinovic ......... | F01D 5/3007 415/173.1 |
| 2011/0182685 | A1* | 7/2011 | Barnat .................... | B23P 13/02 29/889 |
| 2013/0247377 | A1 | 9/2013 | Hathiwala | |
| 2014/0140852 | A1* | 5/2014 | Bluck ................... | F01D 5/3007 416/219 R |
| 2016/0312629 | A1* | 10/2016 | Evans ................... | F01D 5/3007 |

FOREIGN PATENT DOCUMENTS

| | | | | |
|---|---|---|---|---|
| DE | 2549112 | A1 | 4/1977 | |
| DE | 3736836 | A1 | 5/1989 | |
| DE | 4435268 | A1 | 4/1996 | |
| DE | 10357134 | A1 | 6/2005 | |
| EP | 3159483 | A1 * | 4/2017 | ........... F01D 5/3038 |
| GB | 2488864 | A * | 9/2012 | ............... F01D 5/32 |

* cited by examiner

ROTOR DISK, ROTOR, AND METHOD FOR SERVICING A ROTOR DISK

CROSS REFERENCE TO RELATED APPLICATIONS

This application is the US National Stage of International Application No. PCT/EP2023/051311 filed 20 Jan. 2023, and claims the benefit thereof, which is incorporated by reference herein in its entirety. The International Application claims the benefit of German Application No. DE 10 2022 202 368.4 filed 10 Mar. 2022.

FIELD OF INVENTION

The invention relates to an improved slot design of a disk for turbine blades, in particular for weight reduction and/or crack formation avoidance, to a rotor and to a method.

BACKGROUND OF INVENTION

Turbine blades of turbines such as steam turbines or gas turbines are held in corresponding slots of disks (rotor disks) of a turbine.

Here, the slots are of complementary configuration with respect to the blade root which is configured, in particular, in a fir tree or hammer head design.

Examples of this are shown in FIG. 1 of DE 3736836 A1 or in the figure of DE 2549112.

In the case of servicing, the slots of the disks sometimes have cracks.

These discoveries have to be brazed or welded closed, and/or lighter new blades have to be installed, in order that the disk can continue to be used.

SUMMARY OF INVENTION

It is therefore an object of the invention to solve the abovementioned problem.

The object is achieved by way of a slot design of a rotor disk, a rotor, and a method as claimed.

The subclaims list further advantageous measures which can be combined with one another in any desired way, in order to achieve further advantages.

DETAILED DESCRIPTION OF INVENTION

The figure and the description of the alternatives are only exemplary embodiments of the invention.

Figure 1:
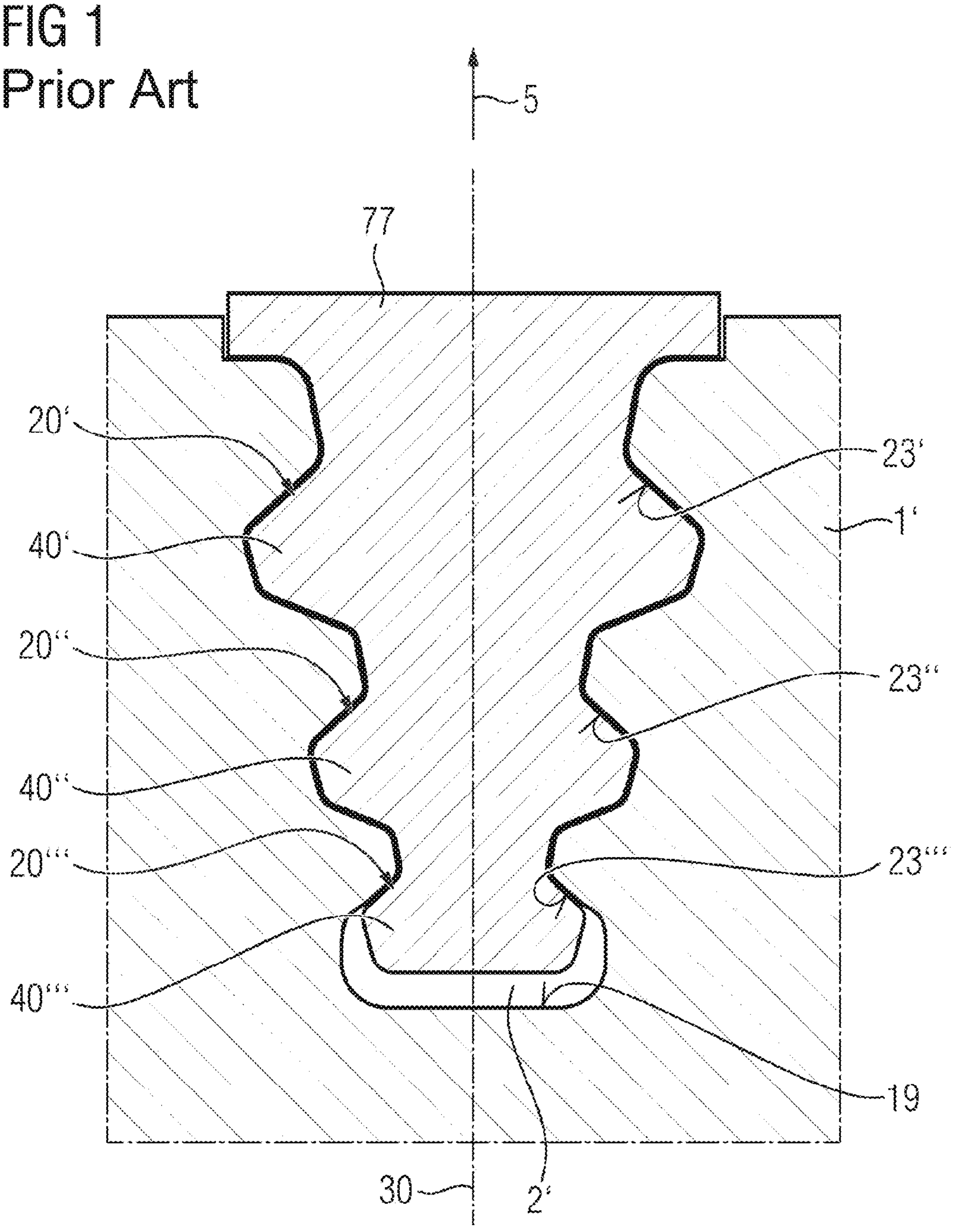
FIG 1 Prior Art
FIG. 1 shows a blade root in a slot from the prior art.

FIG. 1 shows a cross section or side view of a slot 2' in a rotor disk 1' with a blade root 77 from the prior art.

A plurality of rotor disks, in particular on a shaft, form a rotor.

The slot 2' of the rotor disk 1' has a bottom 19.

The slot 2' likewise has a longitudinal axis 30 (radial direction) which is also the longitudinal axis 30 of a turbine blade (not shown in greater detail) or of the blade root 77.

The blade root 77 is introduced into the slot 2' and is held there by way of the design of the slot 2' in a radial direction 5.

On each of the two sides of the longitudinal axis 30 at the same height, the slot 2' has an upper indentation 20', into each of which an upper protrusion 40' of the blade root 77 protrudes and in which it bears in a complementary manner.

For the sake of simplicity, the designations are not always used on each side and at the same axial height in the drawing.

The upper protrusion 40' of the blade root 77 is preferably configured with a hammer head shape or preferably here with a frustoconical shape.

Accordingly, the upper indentation 20' of the slot 2' is of complementary configuration with respect thereto.

The blade root 77 preferably has two further protrusions 40", 40'" on each side here.

Therefore, the slot 2' has a plurality of (preferably two here) further indentations 20", 20'" along the longitudinal axis 30 in the direction of the bottom 19.

The blade root 77 can have one, two or three protrusions 40 (this then also applies to the invention).

The upper protrusion 40' of the blade root 77 bears against an upper bearing surface 23' of the rotor disk 1, in particular if radial forces act in the radial direction 5 in use on the blade and the blade root 77.

There are of course certain tolerances as play between the blade root 77 and the slot 2'.

The end of the blade root 77 is preferably at a spacing from the bottom 19.

Figure 2:
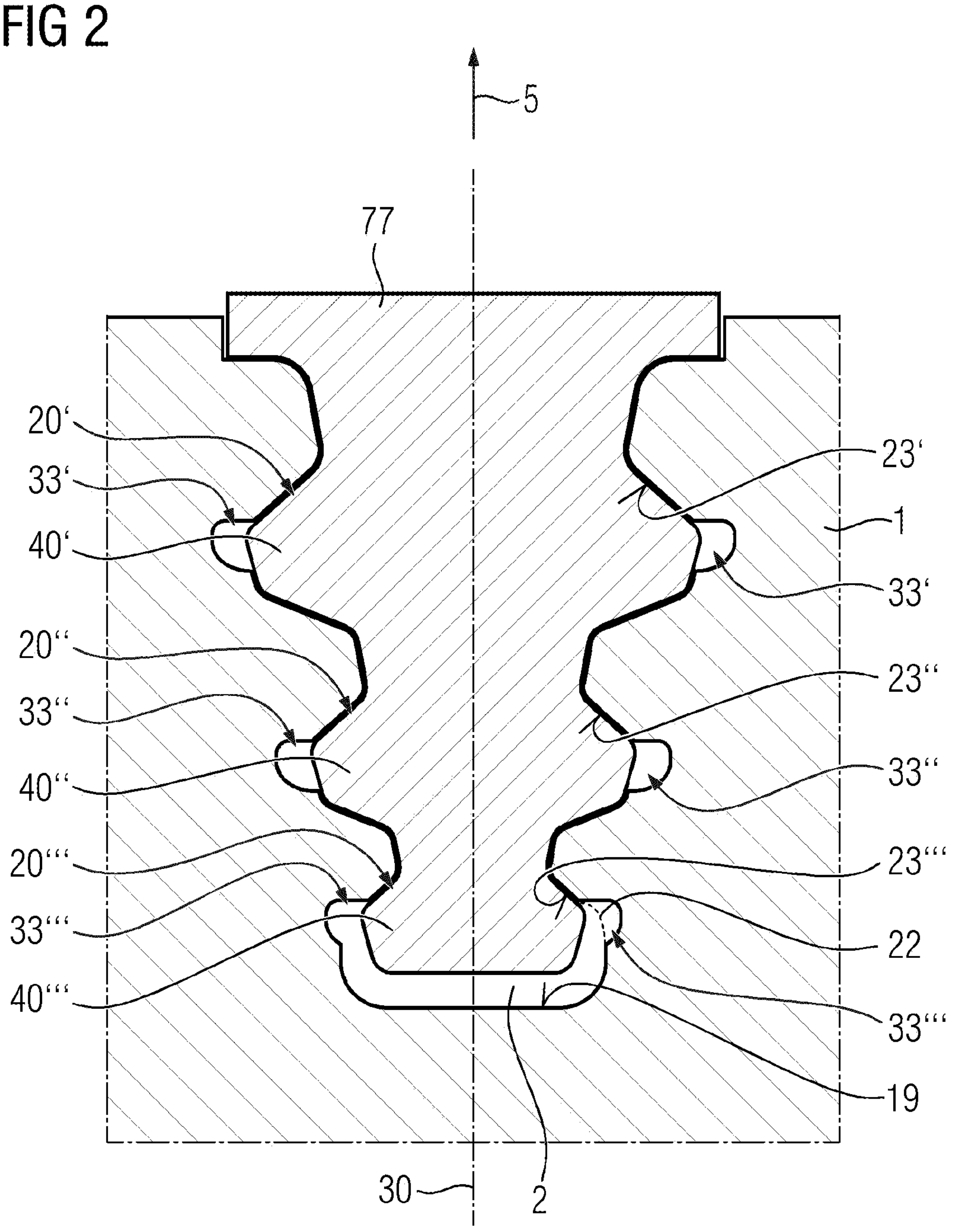
FIG. 2 shows one exemplary embodiment of the invention.

According to the invention, according to FIG. 2 and proceeding from FIG. 1, at least one indentation 20', 20", 20'" (=20) of the slot 2 each has a further bulge 33', 33", 33'" (=33) which extends starting from the indentation 20.

The bulges 33 are preferably present in the indentations 20 on both sides at the same radial height.

A bulge 33 preferably extends on both sides of the longitudinal axis 30, preferably in each indentation 20.

The bulge 33 is preferably arranged only in the upper region of an indentation 20, that is to say does not extend over the entire extent of the top surface of the truncated cone of the protrusion 40 or of that of the indentation 20.

The bulge 33 widens the indentation 20 only in regions, as viewed transversely with respect to the longitudinal axis 30.

As viewed in cross section, the bulge 33 first of all runs almost perpendicularly with respect to the longitudinal axis 30 and then runs back in a curved manner.

The bulge has the shape of a pig's ear.

In the installed state of the blade root 77 and the rotor disk 1, a cavity is therefore formed which is the bulge 33.

The dashed course 22 in the lower indentation 20'" close to the bottom 19 is a bulge according to the prior art (FIG. 1).

The dashed course 22 is constantly curved.

A rotor disk 1 has a plurality of slots 2.

The bulges are present in the respective slots 2 depending on the application, that is to say the slots 2 can have a different number of bulges 33, or only certain indentations 20 have the bulges 33, in particular only the upper indentations 20'.

Further variants are conceivable.

A plurality of rotor disks 1 are used for a rotor. Each rotor disk can have slots 2 equipped identically or differently with bulges 33.

During routine maintenance or in the case of repair, starting from the course 22 from the prior art, an indentation of this type can be produced preventatively, or a crack can be machined out and not brazed or welded closed, but rather machined out in the shape according to the invention and thus left.

All newly produced rotor disks 1 can likewise have bulges 33 of this type.

The invention claimed is:

1. A rotor disk comprising:

a slot for receiving a blade root of a turbine blade, wherein the slot defines a longitudinal axis that is parallel to a radial axis of the turbine blade, a length direction from a leading edge to a trailing edge of the slot, and a transverse direction that is perpendicular to the longitudinal axis and to the length direction, wherein the slot comprises a plurality of indentations disposed along its longitudinal axis, adapted for and complementary to protrusions of the blade root, wherein a bulge is disposed within at least one indentation of the plurality of indentations, wherein in a cross-sectional plane that is perpendicular to the length direction:

the at least one indentation comprises a concave truncated cone shape comprising an upper side bearing surface, a lower side surface, and a top surface therebetween; and the bulge starts with a straight portion that forms a convex corner with and recedes from the upper side bearing surface, and from the straight portion onward the bulge runs to the top surface in a curved manner.

2. The rotor disk as claimed in claim 1, wherein the bulge extends transversely with respect to the longitudinal axis and is of U-shaped configuration.

3. The rotor disk as claimed in claim 1, wherein each indentation of the plurality of indentations comprises a respective bulge.

4. A rotor comprising:

the rotor disk as claimed in claim 1.

5. A method for servicing the rotor disk as claimed in claim 1, comprising:

machining out the bulge in the at least one indentation.

6. The method for servicing as claimed in claim 5, wherein each indentation of the plurality of indentations comprises a respective bulge, and wherein the respective bulges are machined out.

* * * * *